United States Patent
Park et al.

(10) Patent No.: US 11,012,990 B2
(45) Date of Patent: May 18, 2021

(54) METHOD FOR PERFORMING COORDINATED TRANSMISSION IN WIRELESS COMMUNICATION SYSTEM AND APPARATUS THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/622,468

(22) PCT Filed: Jun. 15, 2018

(86) PCT No.: PCT/KR2018/006776
§ 371 (c)(1),
(2) Date: Dec. 13, 2019

(87) PCT Pub. No.: WO2018/231001
PCT Pub. Date: Dec. 20, 2018

(65) Prior Publication Data
US 2020/0383091 A1  Dec. 3, 2020

Related U.S. Application Data

(60) Provisional application No. 62/544,081, filed on Aug. 11, 2017, provisional application No. 62/520,544, filed on Jun. 15, 2017.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
None
See application file for complete search history.

(56) References Cited

U.S. PATENT DOCUMENTS

2019/0013910 A1*  1/2019  Zhang ............... H04L 5/0051
2019/0124631 A1*  4/2019  Ren ................... H04W 72/0466
(Continued)

FOREIGN PATENT DOCUMENTS

KR  10-2011-0086523  7/2011
KR  10-2012-0122816  11/2012

OTHER PUBLICATIONS

Intel Corporation, "Support of NC-JT in NR," R1-1707353, 3GPP TSG RAN WG1 Meeting #89, Hangzhou, P.R. China, dated May 15-19, 2017, 5 pages.
(Continued)

*Primary Examiner* — Rebecca E Song
(74) *Attorney, Agent, or Firm* — Fish & Richardson P.C.

(57) ABSTRACT

A method for performing coordinated transmission in a wireless communication system and an apparatus therefor are disclosed. Specifically, a method for receiving downlink control information (DCI) by a user equipment (UE) in a wireless communication system may comprise the steps of: receiving the DCI from one of a plurality of base stations performing coordinated transmission to the UE; and receiving downlink data scheduled on the basis of the DCI from the plurality of base stations performing the coordinated transmission, wherein a separate transmission layer for the downlink data is transmitted from each base station included in the plurality of base stations, and single piece of information in the DCI indicates a total number of layers scheduled to the UE and demodulation reference signal (DMRS) grouping information associated with the separate transmission layer transmitted from each base station.

10 Claims, 16 Drawing Sheets

(56) References Cited

U.S. PATENT DOCUMENTS

| | | | |
|---|---|---|---|
| 2019/0159209 A1* | 5/2019 | Xiao | H04W 72/0466 |
| 2020/0015203 A1* | 1/2020 | Zhang | H04B 7/024 |
| 2020/0083966 A1* | 3/2020 | Dou | H04L 5/0048 |

OTHER PUBLICATIONS

LG Electronics, "Discussion on cooperative transmission," R1-1707603, 3GPP TSG RAN WG1 Meeting #89, Hangzhou, P.R. China, dated May 15-19, 2017, 7 pages.

Samsung, "CSI Feedback Overhead Reduction for NCJT," R1-1707967, 3GPP TSG RAN WG1 #89, Hangzhou, China, dated May 15-19, 2017, 5 pages.

Samsung, Enhancements for non-coherent JT, R1-1702898, 3GPP TSG RAN WG1#88, Athens, Greece, Feb. 13-17, 2017, 3 pages.

Huawei, HiSilicon, Discussion on enhancements for non-coherent JT, R1-1703063, 3GPP TSG RAN WG1 Meeting #88, Athens, Greece, Feb. 13-17, 2017, 6 pages.

Intel Corporation, Control signalling enhancement for NC-JT, R1-1704691, 3GPP TSG RAN WG1 Meeting #88bis, Spokane, USA Apr. 3-7, 2017, 2 pages.

Samsung, Enhancement to Control Signaling, R1-1705302, 3GPP TSG RAN WG1 Meeting #88bis, Spokane, USA, Apr. 3-7, 2017, 3 pages.

Intel Corporation, Remaining details on CW-to-MIMO layer mapping, R1-1707347, 3GPP TSG RAN WG1 Meeting #89, Hangzhou, P.R. China May 15-19, 2017, 3 pages.

Samsung, Discussions on NR DL multi-TRP and multi-panel support, R1-1707948, 3GPP TSG RAN WG1 Meeting #89, Hangzhou, China, May 15-19, 2017, 6 pages.

Korean Notice of Allowance in Korean Appln. No. 10-2019-7036112, dated May 1, 2020, 7 pages (with English translation).

3rd Generation Partnership Project; Technical Specification Group Radio Access Network, "Study on further enhancements to Coordinated Multi-Point (CoMP) Operation for LTE (Release 14)," 3GPP TR 36.741, V14.0.0, dated Mar. 2017, 25 pages.

EP Extended European Search Report in European Appln. No. 18816739.9, dated Feb. 22, 2021, 10 pages.

Huawei, HiSilicon, "Discussion on control signaling for non-coherent JT," R1-1705115, 3GPP TSG RAN WG1 Meeting #88bis, Spokane, USA, dated Apr. 3-7, 2017, 3 pages.

* cited by examiner (a)

(b)

METHOD FOR PERFORMING COORDINATED TRANSMISSION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/006776, filed on Jun. 15, 2018, which claims the benefit of U.S. Provisional Application No. 62/520,544, filed on Jun. 15, 2017, and No. 62/544,081, filed on Aug. 11, 2017, the contents of which are all hereby incorporated by reference herein in their entirety.

TECHNICAL FIELD

The present disclosure relates to wireless communication systems and, more specifically, to methods of performing coordinated transmission by transmission/reception points (TRPs) and apparatuses for supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE INVENTION

Technical Problem

The present disclosure aims to propose a method for performing coordinated transmission by multiple TRPs.

Another object of the present disclosure is to propose a method for transmitting a single or multiple downlink control information for supporting coordinated transmission by multiple TRPs.

Objects of the present disclosure are not limited to the foregoing, and other unmentioned objects would be apparent to one of ordinary skill in the art from the following description.

Technical Solution

According to an embodiment of the present disclosure, a method of receiving downlink control information (DCI) by a user equipment (UE) in a wireless communication system comprises receiving the DCI from any one of a plurality of base stations performing coordinated transmission to the UE; and receiving downlink data scheduled by the DCI from the plurality of base stations performing the coordinated transmission, wherein a separate transmission layer for the downlink data is transmitted from each of the plurality of base stations, and wherein a total number of layers scheduled for the UE and demodulation reference signal (DMRS) grouping information associated with a separate transmission layer transmitted from each base station are indicated by a single piece of information in the DCI.

According to an embodiment of the present disclosure, a user equipment (UE) receiving DCI in a wireless communication system comprises a transceiver for transmitting or receiving a wireless signal and a processor controlling the transceiver, wherein the processor is configured to receive the DCI from any one of a plurality of base stations performing coordinated transmission to the UE and receive downlink data scheduled by the DCI from the plurality of base stations performing the coordinated transmission, wherein a separate transmission layer for the downlink data is transmitted from each of the plurality of base stations, and wherein a total number of layers scheduled for the UE and demodulation reference signal (DMRS) grouping information associated with a separate transmission layer transmitted from each base station are indicated by a single piece of information in the DCI.

The total number of layers scheduled for the UE may be determined to be a sum of DMRS ports in all DMRS groups according to the DMRS grouping information.

Preferably, the DCI may further include one or more pieces of information among quasi-colocated (QCLed) per separate transmission layer channel state information reference signal (CSI-RS) resource information, rate matching information, or modulation and coding scheme (MCS) information.

Preferably, the DMRS group associated with the separate transmission layer transmitted from each base station may be determined based on the QCLed CSI-RS resource information.

Preferably, information for mapping between the DMRS grouping information and a value of the single piece of information in the DCI may be configured per maximum number of base stations capable of performing the coordinated transmission.

Preferably, the DMRS grouping information may include single transmission by one specific base station as well as coordinated transmission by a plurality of base stations.

Preferably, the maximum number of base stations capable of performing the coordinated transmission may be configured by radio resource control (RRC) and/or medium access control (MAC) signaling.

Preferably, the DMRS grouping information may be determined to differ by a value indicated by the single piece of information in the DCI according to the maximum number of base stations capable of performing the coordinated transmission.

Advantageous Effects

According to various embodiments of the present disclosure, it is possible to effectively perform coordinated transmission by multiple TRPs.

According to various embodiments of the present disclosure, information necessary for coordinated transmission may be dynamically transmitted via first-layer (L1, Physical) downlink control information. This enables rapid application of the context of the UE and/or each TRP which may participate in coordinated transmission. It is thus possible to effectively perform coordinated transmission by multiple TRPs.

Effects of the present disclosure are not limited to the foregoing, and other unmentioned effects would be apparent to one of ordinary skill in the art from the following description.

BRIEF DESCRIPTION OF DRAWINGS

The accompanying drawings, which are included herein as a part of the description for help understanding the present disclosure, provide embodiments of the present disclosure, and describe the technical features of the present disclosure with the description below.

MODE FOR CARRYING OUT THE INVENTION

Figure 1:
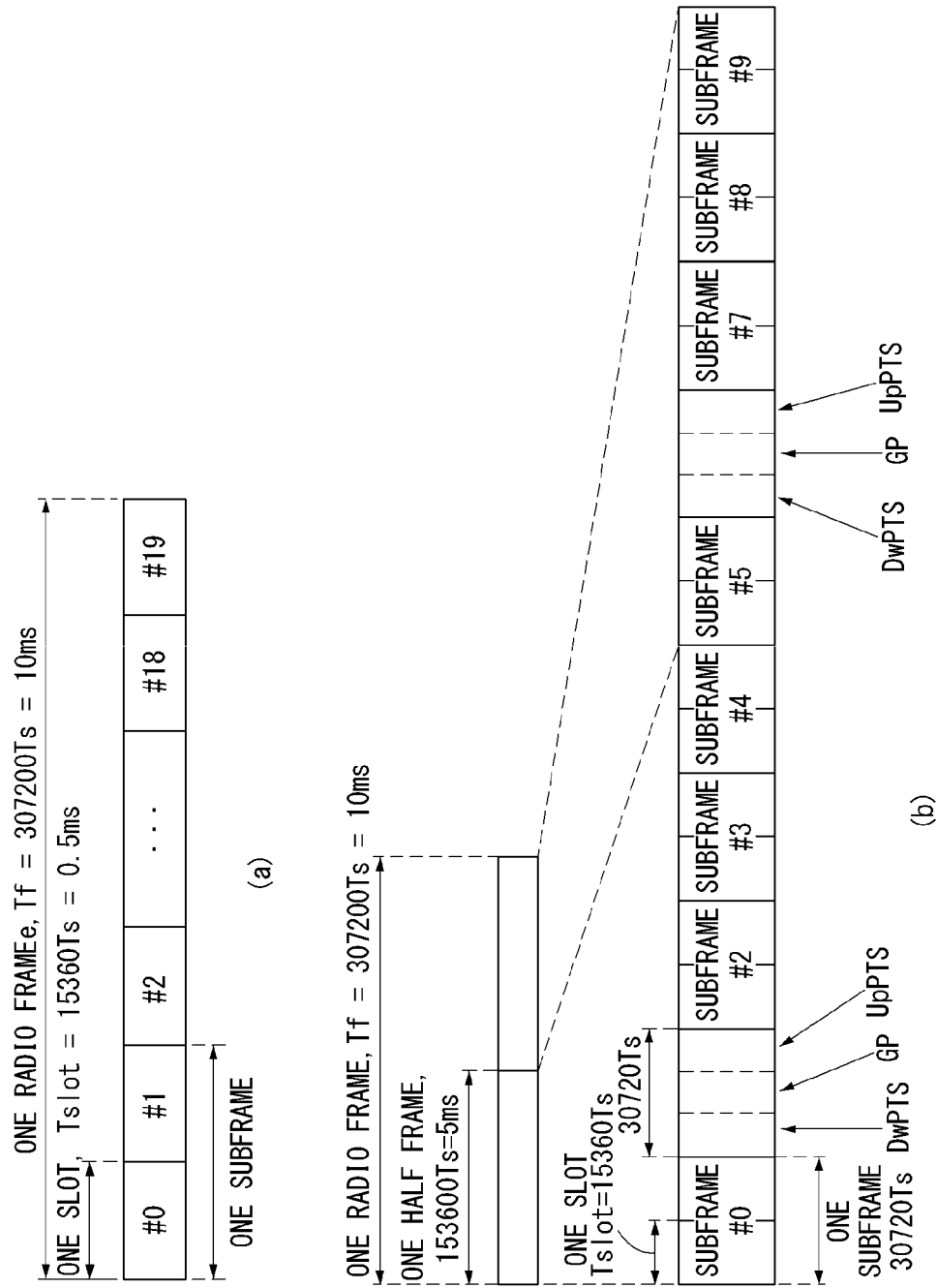
FIG. 1 illustrates the structure of a radio frame in a wireless communication system to which the present disclosure may be applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Overview of a System to which the Present Disclosure May be Applied

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$ in FIG. 1. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission in the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
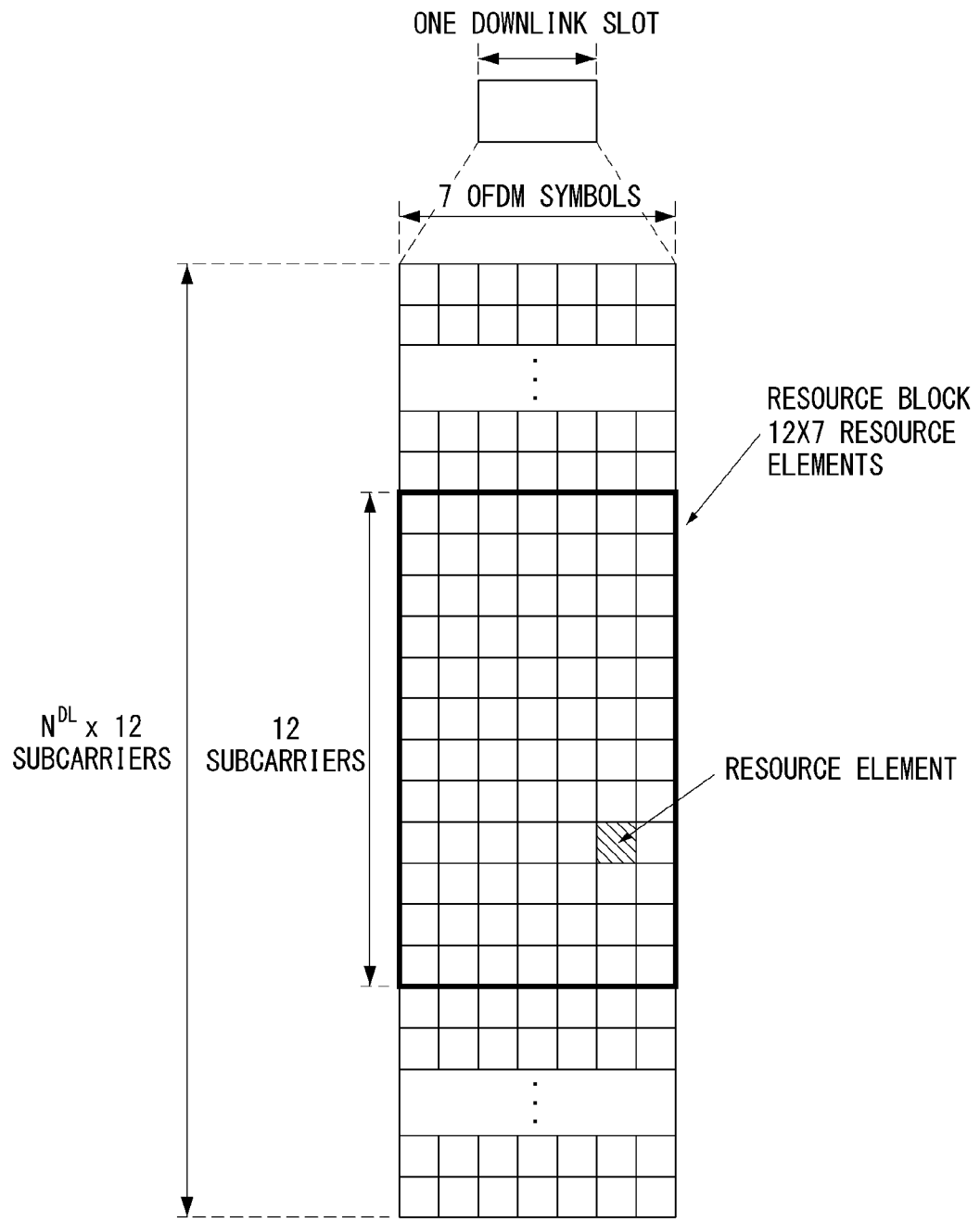
FIG. 2 is a diagram illustrating a resource grid for a downlink slot in a wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
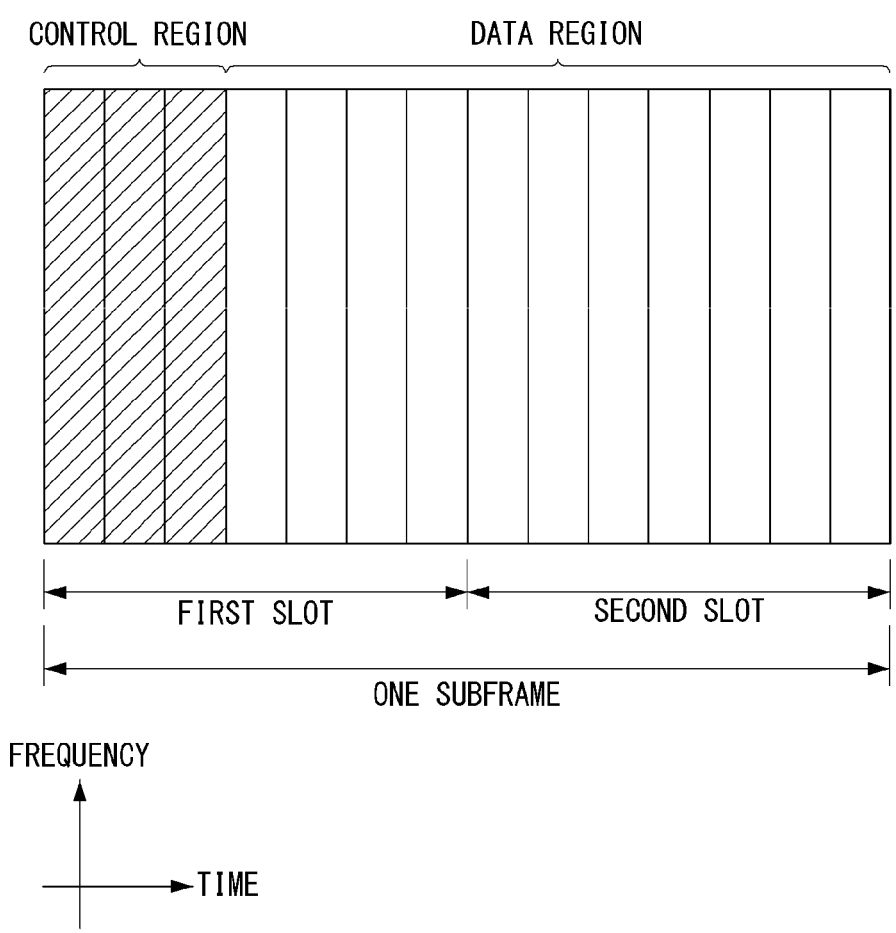
FIG. 3 illustrates a structure of downlink subframe in a wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs. The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

Figure 4:
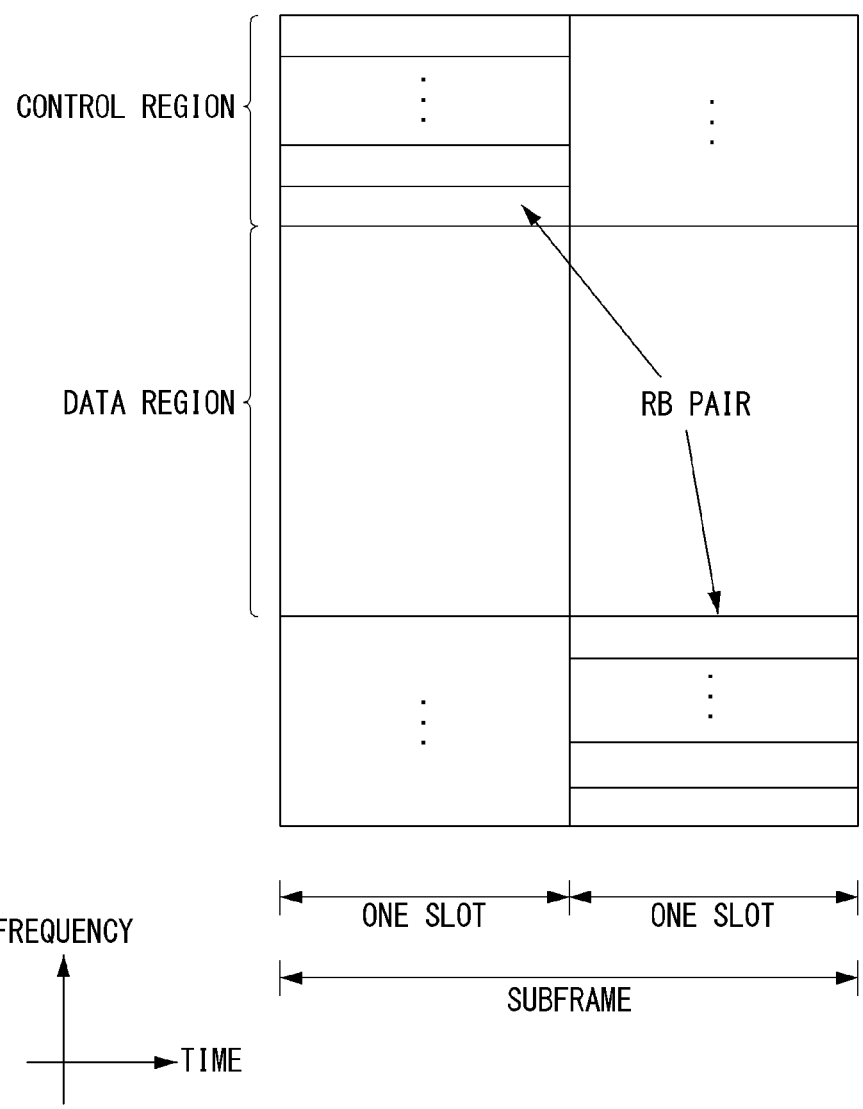
FIG. 4 illustrates a structure of uplink subframe in a wireless communication system to which the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
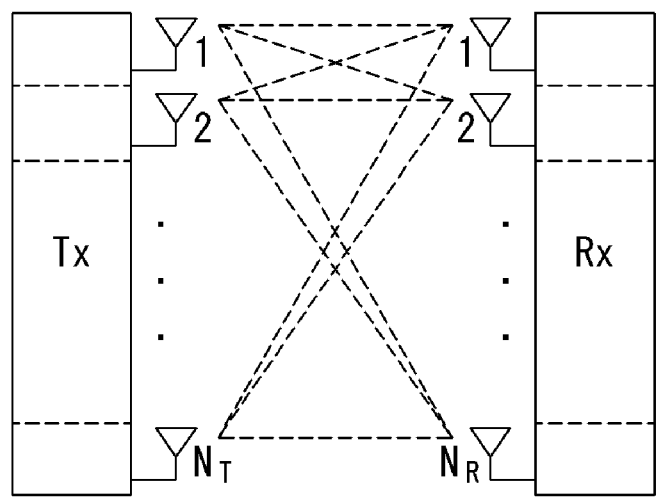
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T$$ [Equation 2]

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. Such transmission signals x_1, x_2, . . . , x_NT may be represented using vector x as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
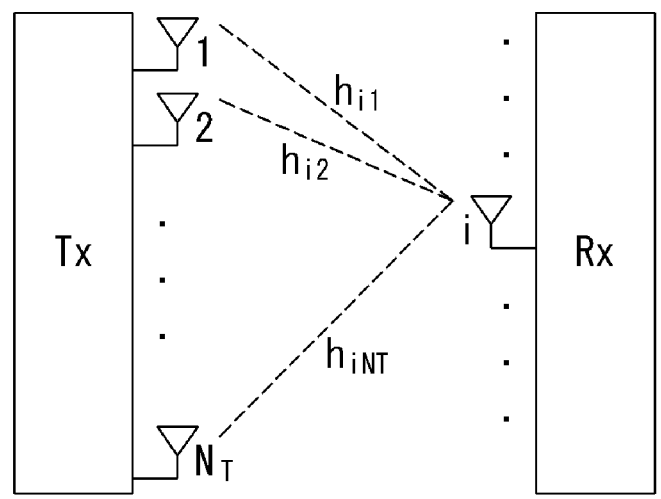
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}]$$ [Equation 7]

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in association with the MIMO transmission techniques described above, a codebook based precoding technique will be described in more detail.

Figure 7:
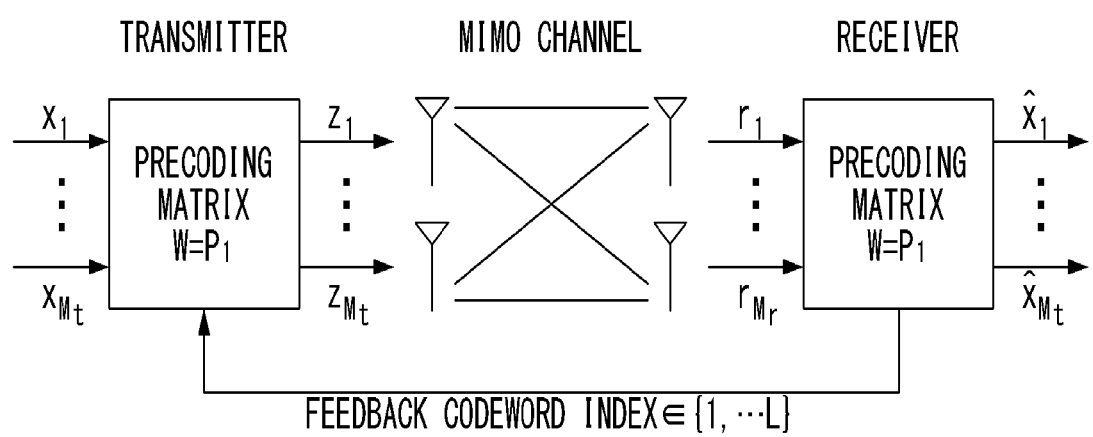
FIG. 7 is a diagram for describing a basic concept of codebook based precoding in a wireless communication system to which the present disclosure may be applied.

FIG. 7 is a diagram for describing a basic concept of codebook based precoding in a wireless communication system to which the present disclosure may be applied.

According to the codebook based precoding technique, the transmitting side and the receiving side share codebook information including a predetermined number of precoding matrixes according to a transmission rank, the number of antennas, and the like.

That is, when feedback information is infinite, the codebook based precoding technique may be used.

The receiving side measures the channel state through the received signal to feed back an infinite number of preferred precoding matrix information (that is, an index of the corresponding precoding matrix) to the transmitting side based on the codebook information. For example, the receiving side measures the received signal by a maximum likelihood (ML) or minimum mean square error (MMSE) technique to select the optimal precoding matrix.

It is illustrated that the receiving side transmits to the transmitting side the precoding matrix information for each codeword in FIG. 7, but the present disclosure need not be limited thereto.

The transmitting side that receives the feedback information from the receiving side may select a specific precoding matrix from the codebook based on the received information. The transmitting side that selects the precoding matrix may perform the precoding by a method that multiplies layer signals of a number corresponding to the transmission rank by the selected precoding matrix and transmit the transmitted signal of which precoding is performed through a plurality of antennas. In the precoding matrix, the number of rows is the same as the number of antennas and the number of columns is the same as a rank value. Since the rank value is the same as the number of layers, the number of columns is the same as the number of layers. For example, when the number of transmission antennas is 4 and the number of transmission layers is 2, the precoding matrix may be configured by a 4×2 matrix. Equation 12 below shows an operation of mapping information mapped to each layer to each antenna through the precoding matrix in such a case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix}$$ [Equation 12]

Referring to Equation 12, the information mapped to the layer is x_1 and x_2 and each element P_ij of the 4×2 matrix is a weight used for precoding. y_1, y_2, y_3, and y_4 which are information mapped to the antennas may be transmitted through the respective antennas using respective OFDM transmission schemes.

The receiving side that receives the signal precoded and transmitted by the transmitting side performs inverse processing of the precoding performed by the transmitting side to restore the received signal. In general, the precoding matrix satisfies a unitary matrix (U) condition such as U·Y^H=I (here, U^ H represents a matrix of matrix U), therefore, the inverse processing of the precoding may be performed by multiplying the received signal by Hermit matrix P^H of the precoding matrix P used for the precoding of the transmitting side.

Further, since the precoding is required to have good performance for various schemes of antenna configurations, it is necessary to consider the performance of various antenna configurations in a codebook design. Hereinafter, an exemplary configuration of multiple antennas will be described.

In the existing 3GPP LTE system (for example, a system according to the 3GPP LTE Release-8 or 9 standard), up to 4 transmission antennas are supported in the downlink, and as a result, a codebook for 4 transmission antennas is designed. The 3GPP LTE-A system, which is an evolution of the existing 3GPP LTE, may support up to 8 transmission antennas in the downlink. Therefore, it is required to design a precoding codebook that provides good performance for downlink transmission over up to 8 transmission antennas.

Further, in the codebook design, it is generally required to provide good performance for a constant modulus property, infinite alphabet, constraint on a codebook size, a nested property, and various antenna configurations.

The constant modulus property means a property in which an amplitude of each channel component of the precoding matrix constituting the codebook is constant. According to such a property, regardless of which precoding matrix is used, power levels transmitted from all antennas, respectively may be kept being the same as each other. Thus, the efficiency of use of a power amplifier may be increased.

The infinite alphabet means, for example, that in the case of two transmission antennas, the precoding matrices are configured by using only a quadrature phase shift keying (QPSK) alphabet (i.e., ±1, ±j) except for a scaling factor. Thus, complexity of computation may be mitigated in multiplication of the precoding matrix by the precoder.

The codebook size may be constrained to a predetermined size or less. As the size of the codebook increases, the precoding matrices for various cases may be included, and as a result, the channel state may be more accurately reflected, but the number of bits of a precoding matrix indicator (PMI) increases, which may cause signaling overhead.

The nested property means that a part of a high-rank precoding matrix is configured by a low-rank precoding matrix. When the precoding matrix is configured as such, proper performance may be ensured even when the eNB determines to perform downlink transmission at a transmission rank lower than a channel rank indicated by a rank indicator (RI) reported from the UE. Further, according to such a property, the complexity of Channel Quality Information (CQI) computation may be reduced. The reason is that at the time of performing an operation of selecting the precoding matrix among precoding matrices designed for different ranks, a part of computation for selecting the precoding matrix may be shared.

Providing the good performance for various antenna configurations means that it is required to provide performance of a predetermined criterion or higher for various cases including an antenna configuration having a low correlation, an antenna configuration having a high correlation, or a cross-polarized antenna configuration.

CoMP (Coordinated Multi-Point Transmission and Reception)

CoMP transmission has been proposed to enhance system performance to meet the requirements for LTE-advanced. CoMP is also known as co-MIMO, collaborative MIMO, or network MIMO. CoMP is expected to enhance the performance of the UE positioned in the cell boundary and the throughput of cell (sector).

Generally, inter-cell interference deteriorates the average cell (sector) efficiency and performance of the UE positioned in the cell boundary in the multi-cell environment where the frequency reuse index is 1. To mitigate inter-cell interference, the LTE system adopts a simple, passive method, e.g., fractional frequency reuse (FFR), to allow the UE positioned in the cell boundary an adequate performance efficiency in the interference-limited environment. However, mitigation of inter-cell interference or reuse of inter-cell interference as the UE's desired signal would be more advantageous than reducing the use of frequency resources per cell. To achieve the foregoing objectives, a CoMP transmission scheme may apply.

CoMP schemes applicable to downlink may be divided into joint processing (JP) and coordinated scheduling/beamforming (CS/CB).

In JP schemes, data may be used in each point (base station) in a CoMP unit. The CoMP unit means a set of base stations used in the CoMP scheme. JP schemes may be divided into joint transmission and dynamic cell selection.

Joint transmission means a scheme in which signals are simultaneously transmitted via the PDSCH from a plurality of points which are the whole or part of a CoMP unit. In other words, data to be transmitted to a single UE may be simultaneously transmitted from a plurality of transmission points. Such joint transmission may increase the quality of signals transmitted to the UE regardless of whether it is done coherently or non-coherently while actively removing interface with other UEs.

Dynamic cell selection means a scheme in which in a CoMP unit a signal is transmitted via the PDSCH from a single point. In other words, data to be transmitted to a single UE at a specific time is transmitted from a single point, and the other points in the CoMP unit transmit no data to the UE. The point which transmits data to the UE may be dynamically selected.

CS/CB enables the CoMP unit to collaboratively perform beamforming for data transmission to a single UE. In other words, although only the serving cell transmits data to the UE, user scheduling/beamforming may be determined via collaboration between a plurality of cells in the CoMP unit.

In the case of uplink, CoMP reception means reception of signals transmitted by collaboration between a plurality of points geographically separated from each other. CoMP schemes applicable to uplink may be divided into joint reception and coordinated scheduling/beamforming (CS/CB).

Joint reception means a scheme in which a plurality of points which are the whole or part of a CoMP unit receive signals transmitted via the PDSCH. Although CS/CB receives signals transmitted via the PDSCH from only a single point, user scheduling/beamforming may be determined by collaboration between a plurality of cells in the CoMP unit.

Quasi Co-Located (QCLed) Between Antenna Ports

The QCL relation is described. For example, if the large-scale property of the wireless channel in which one symbol is transferred via one of two antenna ports may be inferred from the wireless channel in which one symbol is transferred via the other antenna port, the two antenna ports may be said to be in the QCLed relation (or QCLed). The large-scale property includes one or more of delay spread, Doppler spread, Doppler shift, average gain, and average delay.

In other words, the phrase "two antenna ports are in the QCLed relation" means that the large-scale property of the wireless channel from one antenna port is the same as the large-scale property of the wireless channel from the other antenna port. Given a plurality of antenna ports where RSs are transmitted, if the antenna ports through which different kinds of RSs are transmitted are in the QCLed relation, the large-scale property of the wireless channel from one kind of antenna port may be replaced with the large-scale property of the wireless channel from the other kind of antenna port.

According to the concept of QCL, the UE may not assume the same large-scale property between the wireless channels from non-QCL antenna ports. In other words, in such a case, the UE needs to perform independent processing on each set non-QCL antenna port for obtaining timing and tracking, estimation and compensation for frequency offset, delay estimation and Doppler estimation.

For antenna ports for which QCL may be assumed, the UE may advantageously perform the following operations.

For delay spread and Doppler spread, the UE may likewise apply the power-delay profile, delay spread and Doppler spectrum, and Doppler spread estimation results for the wireless channel from any one antenna port to, e.g., the Wiener filter used upon channel estimation for the wireless channel from another antenna port.

For frequency shift and received timing, the UE may perform time and frequency sync on any one antenna port and then apply the same sync to demodulation of another antenna port.

For average reception power, the UE may average reference signal received power measurements for two or more antenna ports.

For example, if the DMRS antenna port for downlink data channel demodulation is QCLed with the CRS antenna port of the serving cell, the UE may likewise apply the large-scale properties of the wireless channel that it has estimated from its own CRS antenna port upon estimating channel via the DMARS antenna port, thereby enhancing the DMRS-based downlink data channel reception capability.

This is why the CRS is a reference signal broadcast with a relatively high density over the entire band and in every subframe, and thus, the estimated large-scale property may be obtained more stably from the CRS. In contrast, the DMRS is transmitted UE-specifically for a specifically scheduled RB, and the precoding matrix used by the base station for transmission in the precoding resource block group (PRG) unit is variable. Thus, the effective channel received by the UE may be varied in each PRG unit. Therefore, although multiple PRGs are scheduled, if the DMRS is used for estimating the large-scale property of wireless channel over a broad band, performance deterioration may arise. Further, since the transmission period of CSI-RS may be a few ms to a few tens of ms, and the per-resource block density is low, e.g., one resource element per antenna port on average, the CSI-RS, if used for estimating the large-scale property of wireless channel may result in performance deterioration as well.

In other words, by assuming QCL between antenna ports, the UE may utilize the same for detection/reception of downlink reference signal, channel estimation, and channel state reporting.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 8:
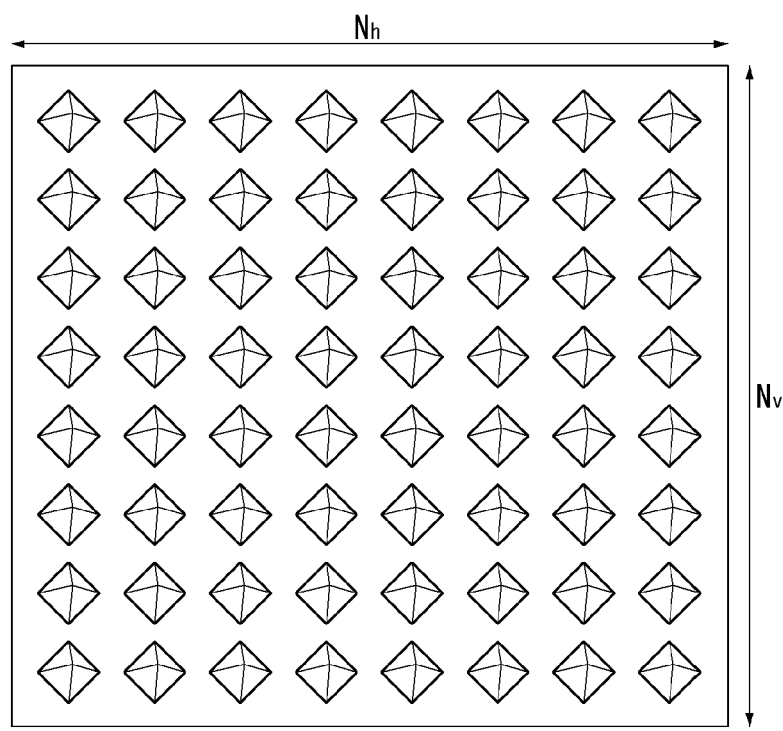
FIG. 8 illustrates a two dimensional active antenna system having 64 antenna elements in a wireless communication system to which the present disclosure may be applied.

FIG. 8 illustrates a 2D AAS having 64 antenna elements in a wireless communication system to which the present disclosure is applicable.

FIG. 8 illustrates a normal 2D antenna array. A case in which Nt=Nv·Nh antennas are arranged in a square form, as shown in FIG. 8, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 9:
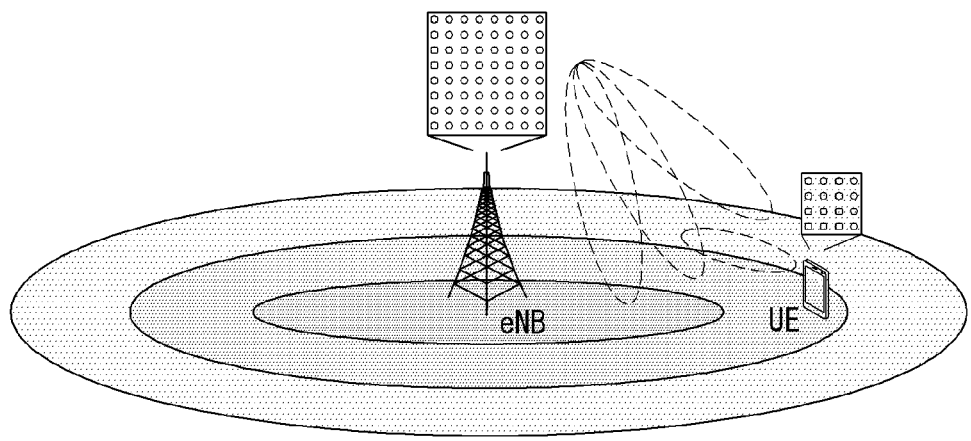
FIG. 9 illustrates a system in which a base station or a terminal has a plurality of transmit/receive antennas capable of AAS-based 3D (3-Dimension) beamforming in a wireless communication system to which the present disclosure may be applied.

FIG. 9 illustrates a system in which an eNB or a UE has a plurality of transmission/reception antennas capable of forming AAS based 3D beams in a wireless communication system to which the present disclosure is applicable.

FIG. 9 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 10:
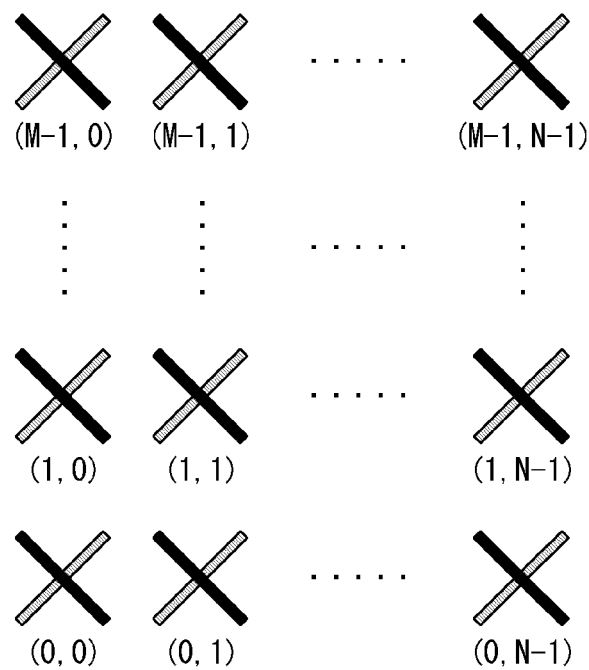
FIG. 10 illustrates a two dimensional antenna system having cross polarization in a wireless communication system to which the present disclosure may be applied.

FIG. 10 illustrates a 2D antenna system having cross polarization in a wireless communication system to which the present disclosure is applicable.

2D planar antenna array model considering polarization may be schematized as shown in FIG. 10.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 10 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 10, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 11:
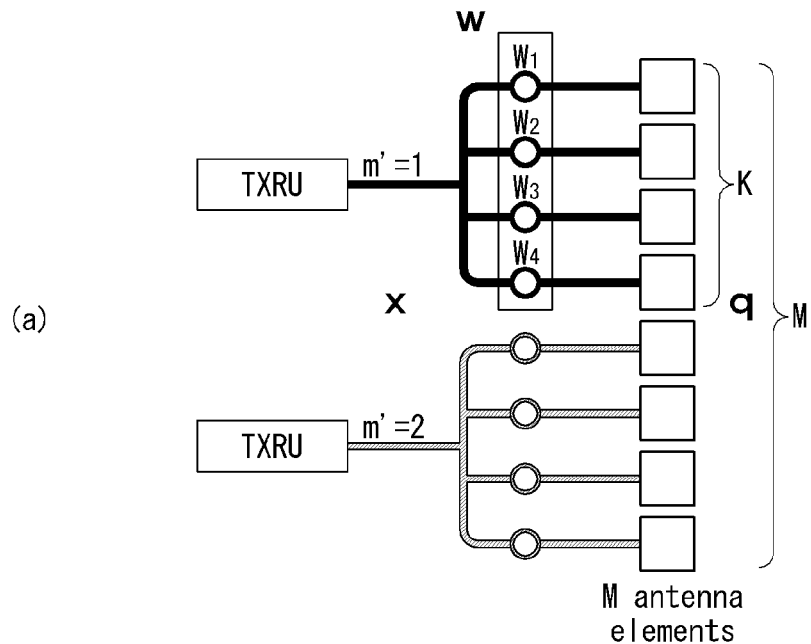
FIG. 11 shows a transceiver unit model in a radio communication system to which the present disclosure can be applied.
Figure 11:
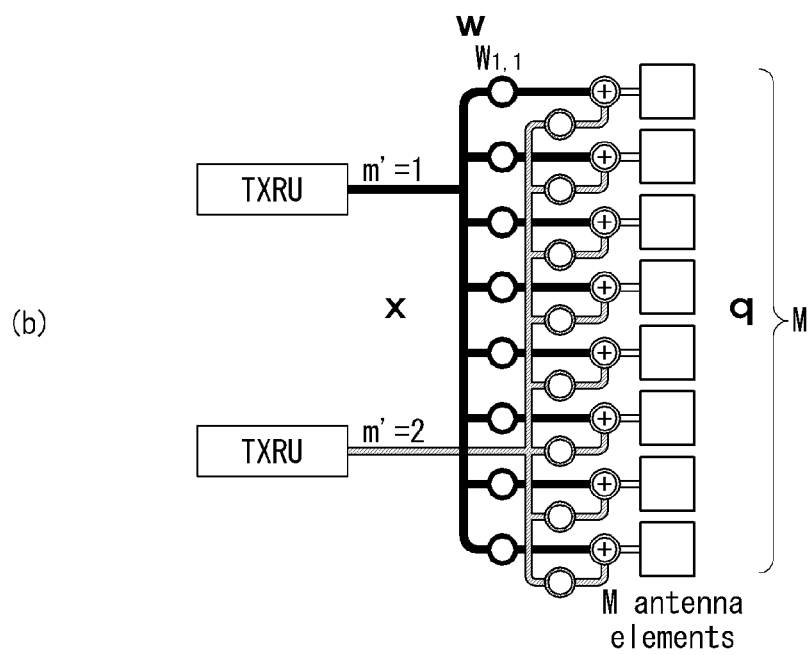

FIG. 11 illustrates transceiver unit models in a wireless communication system to which the present disclosure is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 10 may be represented by (M_TXRU, N, P). Here, M_TXRU denotes the number of 2D TXRUs present in the same column and the same polarization, and M_TXRU≥M all the time. That is, a total number of TXRUs is M_TXRU×N×P.

TXRU virtualization models may be divided into TXRU virtualization model option-1, sub-array partition model as shown in FIG. 11(a) and TXRU virtualization model option-2, full-connection model as shown in FIG. 11(b) according to correlation between antenna elements and TXRU.

Referring to FIG. 11(a), antenna elements are partitioned into multiple antenna element groups and each TXRU is connected to one of the groups in the case of the sub-array partition model.

Referring to FIG. 11(b), multiple TXRU signals are combined and delivered to a single antenna element (or antenna element array) in the case of the full-connection model.

In FIG. 11, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 11 shows an example of TXRU-to-antenna element mapping and the present disclosure is not limited thereto. The present disclosure may be equally applied to mapping between TXRUs and antenna elements realized in various manners in terms of hardware.

OFDM Numerology

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are also one of the major issues to be considered in the next generation communication. In addition, in next-generation communication, a communication system design considering a service/UE sensitive to reliability and latency is being discussed. The introduction of next generation radio access technology considering enhanced mobile broadband communication, massive MTC, ultra-reliable and low latency communication (URLLC) is discussed, and in the present disclosure, the technology is called new RAT.

The NR system adopts the OFDM transmission scheme or a similar transmission scheme, and the NR system has OFDM numerology as represented in Table 3 below.

Table 3 shows example OFDM parameters of the NR system.

TABLE 3

| Parameter | value |
| --- | --- |
| subcarrier-spacing (Δf) | 60 kHz |
| OFDM symbol length | 16.33 us |
| cyclic prefix (CP) length | 1.30 us/1.17 us |
| system bandwidth (BW) | 80 MHz |
| number of subcarriers available | 1200 |
| subframe length | 0.25 ms |
| number of OFDM symbols per subframe | 14 symbols |

Hereinafter, in this specification, the technology may be referred to as a radio access network (RAN) to which NR is applied and may be referred to as an NG-RAN (New Generation-RAN) or a gNB, and may be collectively referred to as a base station.

Self-Contained Subframe Structure

Figure 12:
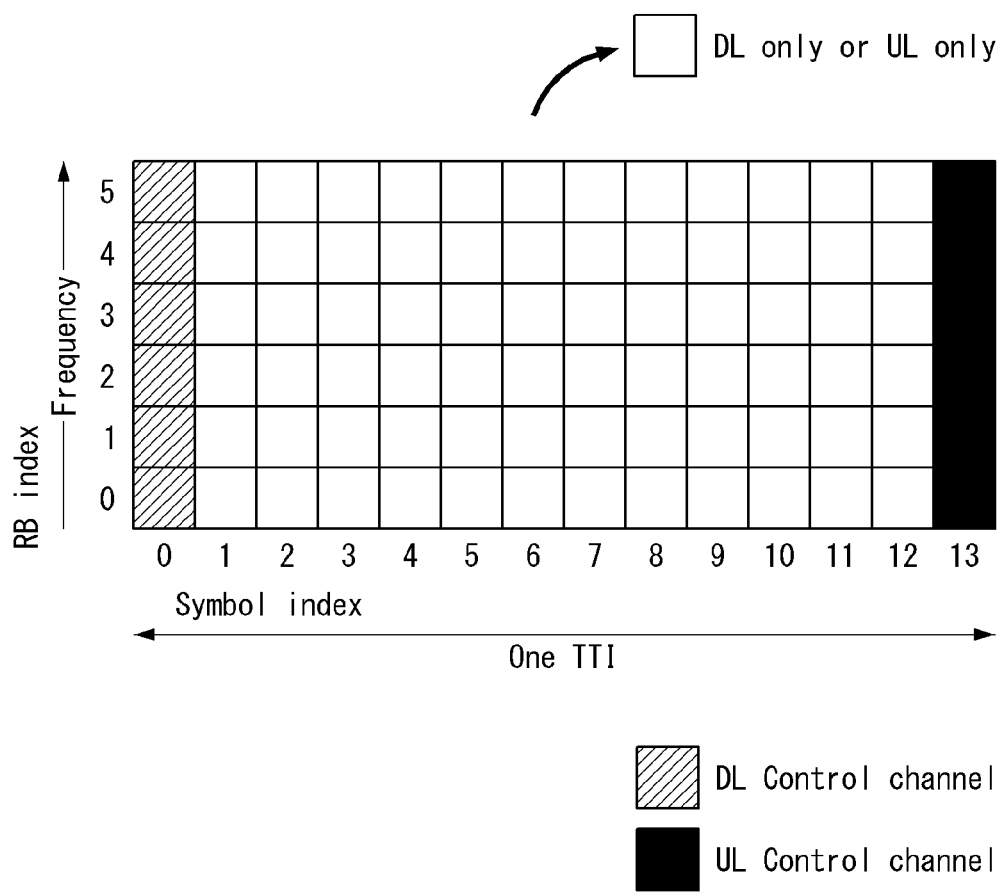
FIG. 12 is a diagram illustrating a self-contained subframe structure in the wireless communication system to which the present disclosure may be applied.

In order to minimize the latency of data transmission in a TDD system, the fifth generation new RAT considers a self-contained subframe structure in which a control channel and a data channel are time division multiplexed (TDMed) as illustrated in FIG. 12.

FIG. 12 is a diagram illustrating a self-contained subframe structure in the wireless communication system to which the present disclosure may be applied.

In FIG. 12, a hatched area indicates a transmission area of a physical channel (e.g., PDCCH) for DCI delivery and a black part indicates a transmission area of the physical channel (e.g., PUCCH) for Uplink Control Information (UCI) delivery.

The control information delivered by the eNB to the UE via the DCI may include information on the cell configuration which the UE should know, DL specific information such as DL scheduling, and/or UL specific information such as a UL grant. Further, the control information by the UE to the eNB via the UCI may include an ACK/NACK report for HARQ for DL data, CSI report for a DL channel state, and/or a scheduling request (SR).

In FIG. 12, an unmark area may be used a physical channel (e.g., PDSCH) transmission area for downlink data and or used as a physical (e.g., PUSCH) transmission area for uplink data. Such a structure is characterized in that DL transmission and UL transmission are sequentially performed in one subframe (SF), and DL data is transmitted in the corresponding SF, and UL ACK/NACK may be received. As a result, according to such a structure, it takes less time to retransmit data when a data transmission error occurs, thereby minimizing the latency of final data delivery.

In such a self-contained subframe structure, there is a need for a time gap between the eNB and the UE for the conversion process from the transmission mode to the reception mode or from the reception mode to the transmission mode. To this end, some OFDM symbols at the time of switching from DL to UL in the subframe structure may be configured to a guard period (GP) and such a subframe type may be referred to as a 'self-contained SF.'

Analog Beamforming

In the millimeter wave (mmW), the wavelength is shortened, so that a plurality of antenna elements may be installed in the same area. That is, a total of 64 antenna elements can be installed in a 2-dimensional array at a 0.5 lambda (i.e., wavelength) interval on a panel of 5×5 cm (alternatively, 5 by 5 cm) with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem in that effectiveness is deteriorated in terms of costs. Therefore, a method of mapping a plurality of antenna elements to one TXRU and adjusting a direction of a beam using an analog phase shifter is considered. Such an analog beamforming method has a disadvantage in that frequency selective beamforming cannot be performed by making only one beam direction in all bands.

A hybrid BF with B TXRUs, which is an intermediate form of digital BF and analog BF, and fewer than Q antenna elements, can be considered. In this case, although there is a difference depending on a connection method of B TXRUs and Q antenna elements, the number of directions of the beams that can be transmitted at the same time is limited to B or less.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 13:
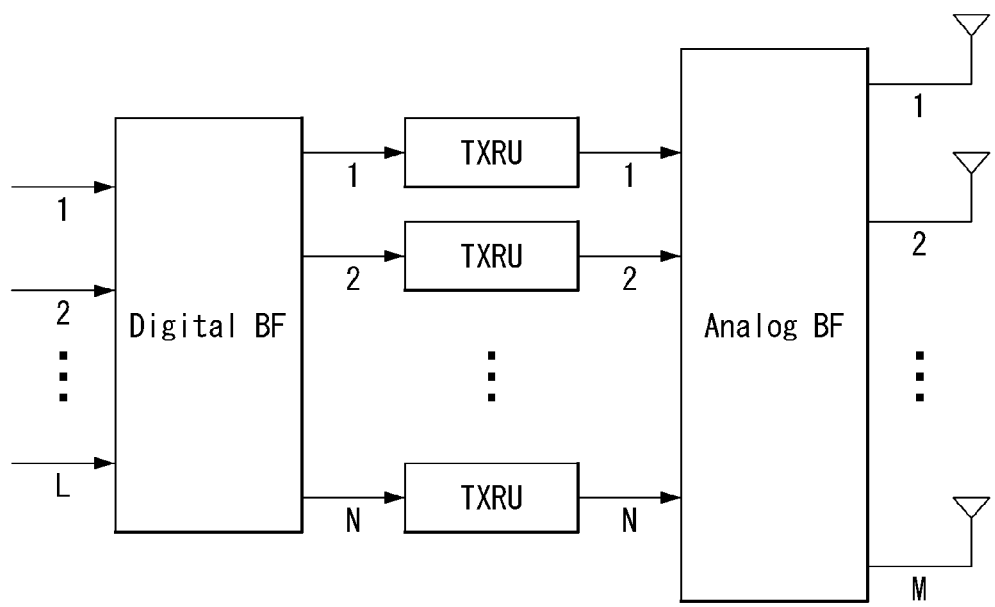
FIG. 13 is a schematic diagram of a hybrid beamforming structure in terms of TXRU and a physical antenna in a wireless communication system to which the present specification may be applied.

FIG. 13 is a diagram illustrating a hybrid beamforming structure in terms of TXRU and a physical antenna in a wireless communication system to which the present specification may be applied.

In FIG. 13, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 13, when N specific TXRUs and M specific RF antennas are defined as one antenna panel, a scheme that introduces a plurality of antenna panels capable of independent hybrid beamforming is also considered in the New RAT system.

When the eNB uses a plurality of analog beams, analog signals favorable for signal reception may different each UE, and as a result, a beam sweeping operation is considered, which allows all UEs to have a reception opportunity by changing a plurality of analog beams which the eNB is to apply for each symbol in a specific subframe (SF) at least with respect to a synchronization signal, system information, paging, etc.

CSI Feedback

In 3GPP LTE(-A) systems, the user equipment (UE) is defined to report the channel state information (CSI) to the base station (BS). Any pieces of information that may indicate the quality of the wireless channel (or link) formed between the UE and the antenna port are collectively referred to as channel state information (CSI). For example, the channel state information may include rank indicator (RI), precoding matrix indicator (PMI), or channel quality indicator (CQI). RI indicates the rank information on the channel, meaning the number of streams that the UE receives via the same time-frequency resource. Since this value is determine dependent upon the long-term fading of channel, the RI is fed back from the UE to the BS in a typically longer period than the PMI or CQI. The PMI is a value reflecting the channel space property. The RI indicates the precoding index favored by the UE with respect to such a metric as signal-to-interference noise ratio (SINR). The CQI is a value indicating the strength of channel. Typically, the CQI means the reception SINR obtainable when the BS uses the PMI.

In the 3GPP LTE(-A) system, the base station may set multiple CSI processes for the UE and receive a CSI report for each process. The CSI process is constituted of the CSI-RS for specifying the quality of signal from the base station and the CSI-interference measurement (CSI-IM) resources.

Method for Performing Coordinated Transmission

The 3GPP has agreed as follows in connection with codeword (CW)-to-layer mapping in NR and cooperative transmission.

In 3, 4 layer transmission, NR supports one codeword for PDSCH and PUSCH each per UE.

Two CWs-to-three layers mapping and two CWs-to-four layers mapping may be supported as well.

Demodulation reference signal (DMRS) port group(s) belonging to one CW may have different quasi co-location (QCL) assumptions.

One UL-related DCI or one DL-related DCI includes one modulation and coding scheme (MCS) per CW.

One CQI is calculated per CW.

A single NR-PDCCH schedules a single NR-PDSCH. The separate layers of the single NR-PDSCH are transmitted from separate transmission/reception points (TRPs).

In other words, a single NR-PDCCH (or a single DCI) transmitted from any one of multiple TRPs participating in the CoMP operation may schedule a single NR-PDSCH that is transmitted from the multiple TRPs to the UE. In this case, the separate layers of the single NR-PDSCH are transmitted from the separate TRPs. For example, a first layer group constituted of one or more layers may be transmitted from a first TRP, and a second layer group constituted of one or more layers may be transmitted from a second TRP. In this case, each layer group may be mapped to a different codeword (CW). Alternatively, all of the layer groups may be mapped to the same codeword (CW) in which case one codeword (CW) may be split into a plurality of sub-codewords which may be individually or separately mapped to the layer groups.

Or, multiple NR-PDCCHs schedule NR-PDSCHs individually or separately transmitted from the separate TRPs.

In other words, a plurality of NR-PDCCHs transmitted from a plurality of TRPs participating in the CoMP operation may individually or separately schedule the NR-PDSCHs transmitted individually or separately from the TRPs.

Also possible is that a single NR-PDCCH schedules a single NR-PDSCH where the layers are jointly transmitted from all the TRPs (i.e., coherent JT).

NR supports the following in reception of multiple NR-PDCCHs that schedule the NR-PDSCHs separately transmitted from the separate TRPs.
 i) The maximum number of NR-PDCCHs/PDSCHs supported is 2, 3, or 4.
 ii) (Explicit or implicit) signaling of the maximum number of NR-PDCCHs/PDSCHs for the UE including the scenario case where a single NR-PDCCH/PDSCH is signaled may be determined.

Based on the above agreement, cooperative transmission of multiple TRPs in NR is described below.

As set forth above, such an agreement has been made: a "single NR-PDCCH supports a single NR-PDSCH where separate layers are transmitted from separate TRPs."

This operation means that a single DCI (transmitted from one TRP (e.g., the serving TRP)) schedules the non-coherent joint transmission (JT) (NCJT) NR-PDSCH transmitted from multiple TRPs. Specifically, coherent JT means that all the scheduled layers are transmitted from all the multiple TRPs to the UE. For example, where four-layer transmission is scheduled for the UE, TRP1 and TRP2 both perform the four-layer transmission. In this case, although a different piece of data may be transferred per layer, in any one specific layer, all the TRPs transmit the same data to the UE. In contrast, non-coherent JT means that some (or all) of the layers scheduled for the UE are transmitted separately from the TRPs. For example, where four-layer transmission is scheduled for the UE, TRP1 may perform two-layer transmission, and TRP2 may perform two-layer transmission. Or, TRP1 alone may perform four-layer transmission (i.e., fallback to single TRP transmission).

In this case, to properly indicate the separate layers per TRP, it is preferable to more specifically determine necessary control information transferred by a single DCI and including any one or more of the following pieces of information:

Information about DMRS port groups (DPGs)

For example, DPG1 includes DMRS ports {0,1), and DPG2 includes DMRS ports {2,3,4}.

DPG1 may be used to demodulate the data on two layers transmitted from a specific TRP, and DPG2 may be used to demodulate the data on three layers transmitted from another TRP.

A different QCL assumption per DPG

For example, CSI-RS1 (quasi co-located (QCLed) with the DMRS ports in DPG1) and CSI-RS2 (quasi co-located (QCLed) with the DMRS ports in DPG2).

Based on the information, the UE may determine that DPG-associated layer(s) are transmitted from the TRP where the CSI-RS resource is transmitted.

In other words, based on the information indicating that CSI-RS1 is a CSI-RS transmitted from TRP1, the UE may recognize that DPG1 QCLed with CSI-RS1 matches TRP1 (i.e., DPG1 is recognized as a DMRS group for demodulating the layer(s) transmitted from TRP1). Based on the information indicating that CSI-RS2 is a CSI-RS transmitted from TRP2, the UE may recognize that DPG2 QCLed with CSI-RS2 matches TRP2 (i.e., DPG2 is recognized as a DMRS group for demodulating the layer(s) transmitted from TRP2).

A different rate matching (RM) assumption per DPG

In other words, an independent (different) RM pattern per DPG may be indicated to the UE. For example, rate matching resource (RMR) 1 (for PDSCH RE mapping for DPG1) and RMR2 (for PDSCH RE mapping for DPG2)

Upon receiving the RM pattern per DPG, the UE may recognize that the PDSCH where the layer (group) mapped with each DPG is transferred (i.e., transmitted from the TRP transmitting the layer (group)) is not mapped to the RE belonging to the RM pattern and may attempt PDSCH decoding. In other words, the UE may apply different RM patterns and attempt decoding on the PDSCH transmitted from each TRP.

Here, the rate matching resource (RMR) is an example of pattern information for indicating the rate matching and may be termed differently. In other words, it may also be interpreted as rate matching information indicated via information named differently (or a field in the DCI) (e.g., zero (0) power CSI-RS trigger field).

As such, since a different interference influence may be had with the neighboring cell per DPG (or per TRP), application of a different rate matching pattern to each DPG (or each TRP) may be more effective in reducing interference.

A different MCS field per DPG

For example, MCS1 (for DPG1) and MCS2 (for DPG2)

If each DPG is assumed to correspond to one CW, a different codeword (CW) may be transmitted per TRP (e.g., a different CW is mapped to the layer (group) transmitted from each TRP) in which case a different MCS level may apply per codeword (CW).

If all the DPGs are assumed to correspond to one CW, the TRPs may transmit the same codeword (CW) (however, the codeword is split to sub-codewords which are mapped to the layers (groups) transmitted from the separate TRPs), and a different MCS level may apply per sub-codeword.

Although a 2-TRP NCJT operation has been assumed for illustration purposes in the above example, the present disclosure is not limited thereto. For example, the present disclosure may also apply to NCJT operations by two or more TPTs.

For example, if 3-TRP NCJT {DPG1, DPG2, DPG3} is considered in the above example, the MCS needs to be updated since an up to 2-CW system is supported in NR. For example, MCS1 corresponding to DPG1 and MCS2 corresponding to DPG2 and DPG3

Proposal 1: Based on the above agreements, a single NR-PDCCH corresponding to different NR-PDSCH data layers from multiple TRPs may include, at least, the following information in the single DCI:

Information about DMRS port group (DPG)
A different QCL/RM assumption per DPG
A different MCS per DPG (each DPG is assumed to correspond to one CW)

And/or, in the above proposal, necessary control information transferred by the single DCI may include, at least, the following updates so as to properly indicate a separated layer(s) per TRP.

- A single DMRS antenna port field indicating the total number v of layers (where v=1, . . . , 8), at least Here, the DMRS port group information for each v value may be set by a higher layer (e.g., by RRC and/or by MAC control element (CE)).

In other words, since the number of separated layers per TRP according to the total number of layers may be preset by higher layer signaling, only the total number of layers may be indicated to the UE by the single DCI.

- A single NR-PQI field (each state of this field may indicate not only one or multiple QCLed CSI-RS resource identifiers (IDs) but also PDSCH RE mapping pattern(s)) may be pre-configured by a higher layer (e.g., by RRC and/or by MAC CE).

If N(>1) CSI-RS resource IDs are indicated, DMRS port group #k (k=1, . . . , K) is assumed to have been QCLed with CSI-RS resource #n=k (if k>N, n=N). Here, K is the number of configured DMRS port groups, and K>=N. Further, the maximum number of N configurable needs to be determined.

As such, when the number of DMRS port groups is K, and N CSI-RS resource IDs are configured for a specific state of the field, e.g., the specific NR-PQI, if K=N, then one-to-one correspondence stands, thus causing no issue. However, if K>N or K<N, the following extra operations may apply.

Where K>N, the above proposal: "if N(>1) CSI-RS resource IDs are indicated, DMRS port group #k (k=1, . . . , K) is assumed to have been QCLed with CSI-RS resource #n=k (if k>N, n=N)" (where K is the number of configured DMRS port groups and K>=N) may apply. In this case, some specific CSI-RS resource(s) among the N CSI-RSs indicated in such a way may jointly apply to multiple specific DPGs. By so doing, one specific QCLed CSI-RS resource may be indicated for all the DPGs. Similar ways or modifications thereto may be interpreted as included in the present disclosure.

If K<N is permitted, such an operation/rule as "if N(>1) CSI-RS resource IDs are indicated, DMRS port group #k (k=1, . . . , K) is CSI-RS resource #n=k" of the above proposal may suffice. In other words, this case may be appreciated as IDs more than K among the N configured CSI-RS resources being disregarded. That is, under the above assumption, the UE is required to apply only up to K CSI-RS resources for QCL purposes per DPG although N CSI-RS resources are configured.

Information about the DMRS port group (DPG) is described below.

The above-described "single DMRS antenna port field" may be regarded as a DMRS configuration field (including an indication for antenna port(s), scrambling identity, and number of layers in LTE).

This field needs to be able to indicate, at least, the total number v (v=1, . . . , 8) of layers so that the v value for PDSCH may dynamically be indicated to the UE by this field. Since the DRMS port group information for each v value is configured by a higher layer (e.g., RRC and/or MAC CE), the UE may recognize how the DMRS port group (DPG) has been set up according to the indicated v value. Given the example of 2-TRP NCJT, there may be available DMRS port grouping candidates as follows. Among the candidates, any one may be pre-configured for the UE.

Table 4 below shows an example mapping relationship between the number v of layers scheduled and the DMRS port grouping information.

TABLE 4

| The number v of layers scheduled within the maximum number | (number of ports in DPG1, number of ports in DPG2) (where up to 2-TRP NCJT is configured) |
|---|---|
| 1 | (1, 0) |
| 2 | (1, 1), (2, 0) |
| 3 | (1, 2), (3, 0) |
| 4 | (1, 3), (2, 2), (4, 0) |
| 5 | (1, 4), (2, 3), (5, 0) |
| 6 | (2, 4), (3, 3), (6, 0) |
| 7 | (3, 4), (7, 0) |
| 8 | (4, 4), (8, 0) |

Referring to Table 4, 18 candidates in total including non-CoMP transmission from one TRP and dynamic switching between the NCJTs from two TRPs may be considered.

For example, the UE may be signaled with a total of 18 states in such a manner where (1, 0) is state '0,' (1, 1) is state '1,' (2, 0) is state '2,' . . . .

To transfer such information, a 5-bit field may be designed to cover all possible combinations of scheduled DPG(s) indicated up to 2-TRP NCJT.

By such higher layer signaling (e.g., RRC and/or MAC CE), the DMRS port grouping information may be provided to the UE.

And/or, the DMRS port grouping information may be indicated to the DCI (i.e., the first layer (L1, Layer 1)) more dynamically.

The above-described information as to how many DPGs are used (i.e., the DMRS port grouping information) may also let the UE know the total number of scheduled layers. For example, since DPG1 is indicated to have two ports, and DPG2 is indicated to have three ports, the total number of layers is five in the above example.

Table 5 below shows an example mapping relationship between the number v of layers scheduled and the DMRS port grouping information.

TABLE 5

| The number v of layers scheduled within the maximum number | (number of ports in DPG1, number of ports in DPG2, number of ports in DPG3) (where up to 3-TRP NCJT is configured) |
|---|---|
| 1 | (1, 0, 0) |
| 2 | (1, 1, 0), (2, 0, 0) |
| 3 | (1, 2, 0), (3, 0, 0), (1, 1, 1) |
| 4 | (1, 3, 0), (2, 2, 0), (4, 0, 0), (1, 1, 2) |
| 5 | (1, 4, 0), (2, 3, 0), (5, 0, 0), (1, 1, 3), (1, 2, 2) |
| 6 | (2, 4, 0), (3, 3, 0), (6, 0, 0), (1, 1, 4), (1, 2, 3), (2, 2, 2) |
| 7 | (3, 4, 0), (7, 0, 0), (1, 2, 4), (1, 3, 3), (2, 2, 3) |
| 8 | (4, 4, 0), (8, 0, 0), (1, 3, 4), (2, 2, 4), (2, 3, 3) |

Referring to Table 5, 31 candidates in total including non-CoMP transmission from one TRP and dynamic switching between the NCJTs from two or three TRPs may be considered. Here, (1, 1, 1), (1, 1, 2), (1, 1, 3), (1, 2, 2), (1, 1, 4), (1, 2, 3), (2, 2, 2), (1, 2, 4), (1, 3, 3), (2, 2, 3), (1, 3, 4), (2, 2, 4), and (2, 3, 3) means NCJTs from three TRPs.

For example, the UE may be signaled with a total of 31 states in such a manner where (1, 0, 0) is state '0,' (1, 1, 0) is state '1,' (2, 0, 0) is state '2,' . . . .

To transfer such information, a 5-bit field may be designed to cover all possible combinations of scheduled DPG(s) indicated up to 3-TRP NCJT.

As described above in connection with Table 4 or 5, a "specific CoMP scheme (e.g., NCJT) is applicable to up to N TRPs" (specific DL grant DCI is transmittable on downlink based on this scheme) may be set to the UE by higher layer signaling (e.g., by RRC and/or by MAC CE).

For example, if the "up to two TRPs" configuration is provided to the UE, then the UE may be configured/indicated to apply a specific encoding table (corresponding DCI field) mapped with the corresponding state according to Table 4 (e.g., the 18 states in total or some thereof or additional states including the same (e.g., a (y, x) state corresponding to a specific (x, y) state in which case the state description of NR-PQI may be more simplified). For example, only some of the states defined in Table 2 or additional states other than all of the states defined in Table 2 may be provided to the UE by higher layer signaling (by RRC and/or MAC CE).

If the "up to three TRPs" configuration is provided to the UE, then the UE may be configured/indicated to apply a specific encoding table (corresponding DCI field) mapped with the corresponding states according to Table 5 (e.g., the 31 states in total or some thereof or additional states including the same (e.g., a (z, y, x) and/or (y, x, z) state corresponding to a specific (x, y, z) state in which case the state description of NR-PQI may be more simplified).

As shown in Tables 4 and 5, if the DPG group information is provided to the UE, the UE may be aware how all the configured layers are divided. For example, where the DPG group information is indicated (1, 2), the UE may be aware that 1-layer transmission is configured from any one TRP and 2-layer transmission is configured from another TRP. Based on the different-QCL-assumption-per-DPG information (i.e., the information of the CSI-RS QCLed per DPG), the UE may be aware which one of the two TRPs performs 1-layer transmission or 2-layer transmission. In other words, the UE may determine that from the TRP where the corresponding QCLed CSI-RS resource is transmitted, the layer(s) associated with the DPG corresponding thereto are transmitted.

Although Tables 4 and 5 show example encoding tables applied in the 2-TRP and 3-TRP CoMP contexts, respectively, for illustration purposes, the present disclosure is not limited thereto but the concept of the present disclosure may be modified/expanded to be applied to encoding tables which may apply even in the CoMP context of 4 or more TRPs.

A different QCL/RM assumption per DPG is described below.

Considering the PDSCH RE mapping and quasi-co-location indicator (PQI) field in LTE DCI format 2D, each PQI state jointly indicates the PDSCH RE mapping and QCLed CSI-RS resource ID. As set forth above, as expanding to indicate per DPG, joint encoding of the QCL and RM indication may also apply to NR CoMP. This field is denoted NR-PQI. That is, as in the above example, when up to 2-TRP NCJT is configured for the UE, a single NR-PDCCH may include a total of two NR-PQI fields since an NR-PQI field is included per DPG.

A different MCS per DPG is described below.

Since NR supports up to 2 CWs as does LTE, up to two MCS fields are required in a single DCI. As set forth above, considering 3-TRP NCJT, additional mapping information to the DPG(s) of each MCS field is needed.

In Table 4 or 5 above, when the total rank is equal to or larger than 4, the cases of (x, 0) and (x, 0, 0) indicate single TRP transmission, rather than NCJT, so that two MCS fields may correspond to a single DPG.

A method for enhancing CSI feedback for NCJT is described below.

In light of CSI feedback, it is preferable to allow the UE to report {RI, PMI} per TRP (corresponding to the configured CSI-RS resource) and to provide support to be able to report composite CQI under the assumption of NCJT. In the 2-TRP NCJT example, the UE reports RI1 for TP1 and RI2 for TP2 and, when RI1+RI2>4, the UE assumes an RI1 layer for CW1 and an RI2 layer for CW2 and calculates the CQI for each CW. In this case, the UE reports RI1 and RI2, thereby allowing each TRP to be aware of CW-to-layer mapping.

Figure 14:
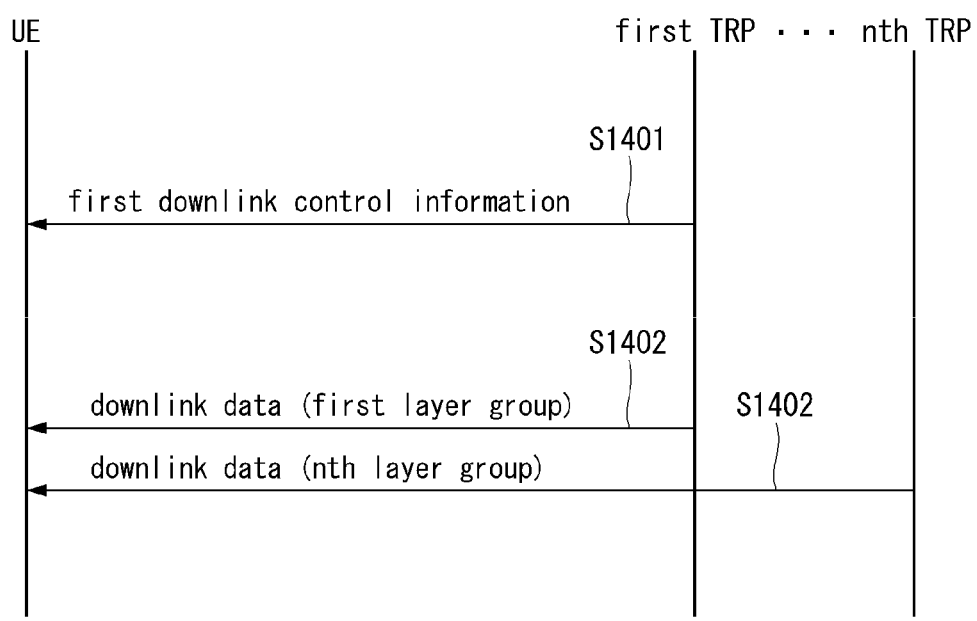
FIG. 14 is a view illustrating a method of performing coordinated transmission by multiple TRPs according to an embodiment of the present disclosure.

FIG. 14 is a view illustrating a method of performing coordinated transmission by multiple TRPs according to an embodiment of the present disclosure.

Referring to FIG. 14, the UE receives downlink control information (DCI) from any one TRP (a first TRP in FIG. 14) among a plurality of TRPs (e.g., base stations) performing coordinated transmission to the UE (S1401).

In this case, DMRS grouping information associated with separate transmission layers (a first layer group, . . . , an nth layer group in FIG. 14) transmitted from the separate TRPs and the number of all the layers scheduled for the UE may be indicated by a single piece of information in the DCI.

For example, according to Table 4 described above, if '1' is indicated in the DCI, the DMRS grouping information is indicated (1, 1) (i.e., the number of DMRS ports belonging to the DMRS group of the first TRP is 1 (this is identical to the number of transmission layers transmitted from the first TRP), and the number of DMRS ports belonging to the DMRS group of the second TRP is 1 (this is identical to the number of transmission layers transmitted from the second TRP)), and the total number of transmission layers configured for the UE may be indicated 2.

According to Table 5 described above, if '1' is indicated in the DCI, the DMRS grouping information is indicated (1, 1, 0) (i.e., the number of DMRS ports belonging to the DMRS group of the first TRP is 1 (this is identical to the number of transmission layers transmitted from the first TRP), the number of DMRS ports belonging to the DMRS group of the second TRP is 1 (this is identical to the number of transmission layers transmitted from the second TRP), and the number of DMRS ports belonging to the DMRS group of the third TRP is 0 (this is identical to the number of transmission layers transmitted from the third TRP), and the total number of transmission layers configured for the UE may be indicated 2.

As such, the total number of transmission layers configured for the UE may not explicitly be indicated in the DCI but may rather be implicitly determined to be the sum of the numbers of DMRS ports in all the DMRS groups according to the DMRS grouping information.

As described above, the DCI may further include one or more pieces of information among channel state information reference signal (CSI-RS) resource information QCLed per separate transmission layer, rate matching information, or modulation and coding scheme (MCS) information.

The DMRS group associated with the separate transmission layer transmitted from each base station may be determined based on the QCLed CSI-RS resource information. In other words, the UE may be aware which TRP transmits what layer group (i.e., which DMRS group is associated with the corresponding TRP) based on the information.

Further, information (e.g., information shown in Table 4 or 5) for mapping between DMRS grouping information and the single information value in the DCI per maximum number of base stations capable of performing coordinated transmission may be pre-configured by higher layer signaling. As in the example shown in Table 4 or 5 above, the DMRS grouping information may include single transmission by one specific base station as well as coordinated transmission by a plurality of base stations.

The maximum number of base stations capable of coordinated transmission may be configured for the UE by higher layer signaling. Thus, different DMRS grouping information may be determined by the value indicated by the single piece of information in the DCI according to the maximum number of base stations capable of coordinated transmission configured by the higher layer. For example, where the maximum number of base stations capable of coordinated transmission is 2, the DMRS grouping information may be determined by referring to Table 4 above. In contrast, where the maximum number of base stations capable of coordinated transmission is 3, the DMRS grouping information may be determined by referring to Table 5 above.

The UE receives downlink data scheduled by the DCI from the plurality of TRPs performing coordinated transmission (S1402).

In this case, separate transmission layers for downlink data may be transmitted from separate ones of the plurality of TRPs (performing coordinated transmission). In other words, as described above in connection with FIG. 14, the first TRP may transmit the first layer group (including one or more layer groups), . . . , the nth TRP may transmit the nth layer group (including one or more transmission layers).

Described below is an NCJT method based on multiple NR-PDCCHs.

The multiple NR-PDCCHs may transfer only control information for the layers that the TRPs separately transmit.

Thus, instead of the information for the DMRS port group (DPG) includable in the single NR-PDCCH described above, the total number of layers each TRP transmits may be included. In other words, the DMRS ports may be sequentially mapped per layer depending on the total number of layers.

Instead of the QCL assumption information per DPG includable in the single NR-PDCCH described above, the multiple NR-PDCCHs may include the CSI-RS resource information QCLed with the DMRS ports associated with the layers the TRPs separately transmit.

Instead of the per-DPG RM information includable in the single NR-PDCCH described above, the multiple NR-PDCCHs may include rate matching information for the respective transmission layers of the TRPs.

Instead of the per-DPG MCS level information includable in the single NR-PDCCH described above, the multiple NR-PDCCHs may include MCS information for the respective transmission layers of the TRPs.

In relation to the operation for NR reception, such as "multiple NR-PDCCHs scheduling the separate NR-PDSCHs that the separate TRPs transmit," this scheme may be interpreted as dual-connectivity (DC) based on the operation over the same carrier.

Given the complexity of the UE for receiving multiple NR-PDCCHs, the maximum number of NR-PDCCHs/PDSCHs supported is preferably two. Since this operation requires multiple blind detection processing via multiple TRPs on the UE side, the complexity reducing/UE power saving mechanism needs to consider an activation/deactivation mechanism not only for independent monitoring slot set per NR-PDCCH but also for multiple-DCI monitoring (however, it is preferable for the UE not to monitor one or more NR-PDCCHs).

Regarding the "independent monitoring slot set per NR-PDCCH" scheme, to relieve the complexity of the UE, e.g., blind detection (BD), the base station may notify the UE that the multiple NR-PDCCHs are transmittable only for a specific preconfigured "subframe/slot set." In other words, the base station may provide the UE with the configuration information to allow the multiple DCI (specific DCI(s)) to be monitored (e.g., blind detection) only for the corresponding subframe/slot (e.g., by RRC and/or MAC CE). For example, a configuration for NCJT mode activation, along with a configuration for multiple-DCI (specific DCI(s)) monitoring, may be made for the UE by higher layer signaling (e.g., by RRC and/or MAC CE).

For example, such configuration information as indicating that up to (specific) N (>2) DCIs need to be monitored for a certain subframe/slot set, and/or up to specific two DCIs (e.g., which two of the DCIs are may also be set) need to be monitored for another subframe/slot set, and only one DCI needs to be monitored for another subframe/slot set may be provided to the UE.

For example, the UE may be configured to monitor up to n DCIs only in the subframe/slot set which periodically has a predetermined time interval (e.g., 40 ms).

As another example, for such configuration, a bitmap of a predetermined time interval (e.g., 40 ms) may be used in each subframe/slot unit. In this case, the UE may be configured to monitor up to n DCIs only in the subframes/slots for which the bit value is set to a specific value ('1' or '0').

When the UE is configured to monitor a plurality of DCIs, the plurality of DCIs may be decoded in different control resource sets (CORESETs) and/or different search spaces.

Figure 15:
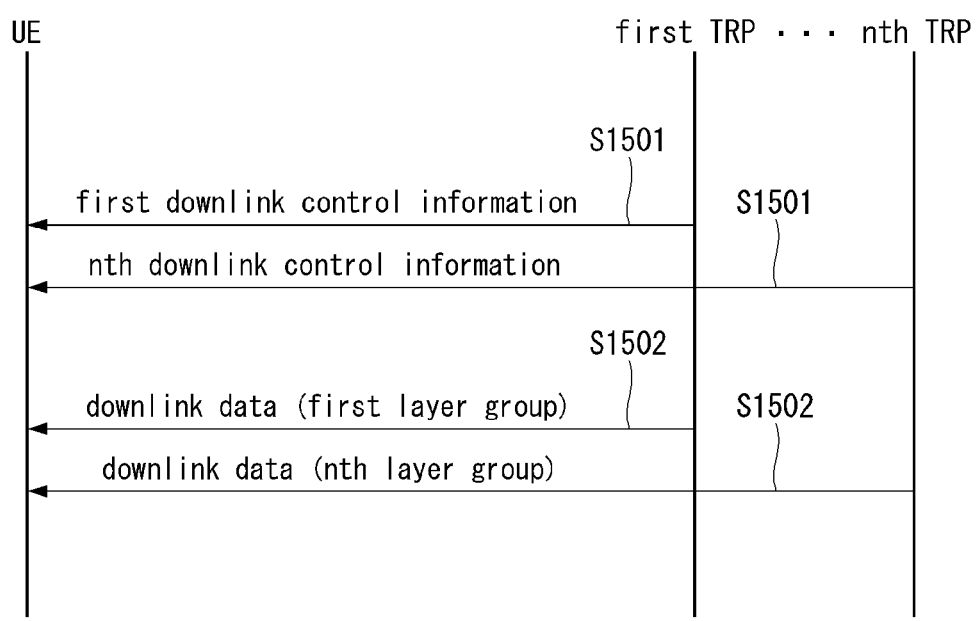
FIG. 15 is a view illustrating a method of performing coordinated transmission by multiple TRPs according to an embodiment of the present disclosure.

FIG. 15 is a view illustrating a method of performing coordinated transmission by multiple TRPs according to an embodiment of the present disclosure.

Referring to FIG. 15, the UE receives a DCI from each of a plurality of TRPs (e.g., base stations) performing coordinated transmission to the UE (S1501).

As shown in FIG. 15, the UE may receive a first DCI from a first TRP, . . . , an nth DCI from an nth TRP.

As described above, the DCI transmitted from each TRP may include the total number of layers transmitted by the TRP. In other words, the DMRS ports may be sequentially mapped per layer depending on the total number of layers.

The DCI from each TRP may include one or more pieces of information among CSI-RS resource information QCLed with the DMRS ports associated with the layer the TRP transmits, rate matching information for the transmission layers of the separate TRPs, or MCS information for the transmission layer of the TRP.

In this case, as described above, the UE may be configured so that multiple NR-PDCCHs may be transmitted only for a pre-configured "subframe/slot set." In this case, the UE may monitor the multiple NR-PDCCHs only in the pre-configured "subframe/slot set."

The UE receives downlink data scheduled by each DCI from the plurality of TRPs performing coordinated transmission (S1502).

In this case, separate transmission layers for downlink data may be transmitted from separate ones of the plurality of TRPs (performing coordinated transmission). In other words, as described above in connection with FIG. 15, the first TRP may transmit the first layer group (including one or more layer groups), ... , the nth TRP may transmit the nth layer group (including one or more transmission layers).

Overview of Apparatus to Which the Present Disclosure May Apply

Figure 16:
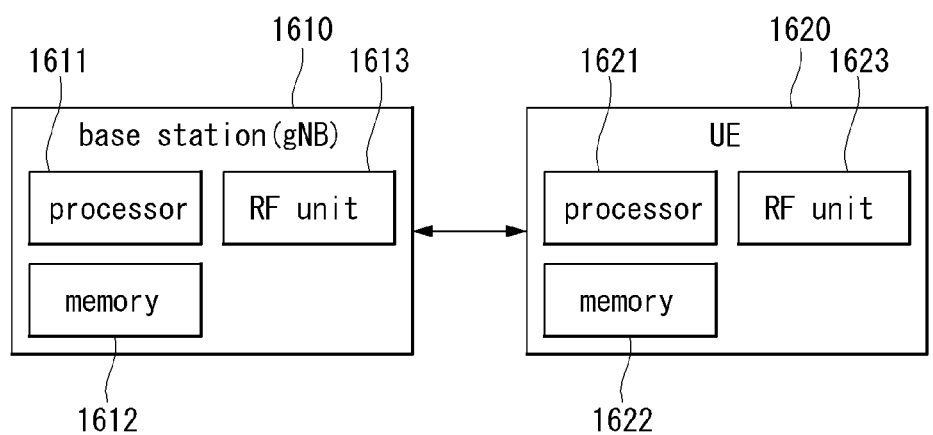
FIG. 16 is a block diagram illustrating a configuration of a wireless communication device according to an embodiment of the present disclosure.

FIG. 16 is a block diagram illustrating a configuration of a wireless communication device according to an embodiment of the present disclosure.

Referring to FIG. 16, a wireless communication system includes a base station 1610 and a plurality of UEs 1620 positioned in the coverage of the base station 1610.

The base station 1610 includes a processor 1611, a memory 1612, and a radio frequency (RF) unit 1613 (or a transceiver). The processor 1611 implements the functions, processes or steps, and/or methods proposed above in connection with FIGS. 1 to 15. Wireless interface protocol layers may be implemented by the processor 1611. The memory 1612 is connected with the processor 1611 to store various pieces of information for driving the processor 1611. The RF unit 1613 is connected with the processor 1611 to transmit and/or receive wireless signals.

The UE 1620 includes a processor 1621, a memory 1622, and an RF unit 1623 (or a transceiver). The processor 1621 implements the functions, processes or steps, and/or methods proposed above in connection with FIGS. 1 to 15. Wireless interface protocol layers may be implemented by the processor 1621. The memory 1622 is connected with the processor 1621 to store various pieces of information for driving the processor 1621. The RF unit 1623 is connected with the processor 1621 to transmit and/or receive wireless signals.

The memory 1612 and 1622 may be positioned inside or outside the processor 1611 and 1621 and be connected with the processor 1611 and 1612 via various known means. The base station 1610 and/or the UE 1620 may include a single or multiple antennas.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL AVAILABILITY

Although the present disclosure has been shown and described in connection with examples applied to 3GPP fifth generation (5G) systems, the present disclosure may also be applicable to other various wireless communication systems than 3GPP 5G systems.

The invention claimed is:

1. A method of receiving downlink control information (DCI) by a user equipment (UE) in a wireless communication system, the method comprising:
    receiving the DCI from any one of a plurality of base stations performing coordinated transmission to the UE; and
    receiving, from the plurality of base stations performing the coordinated transmission, downlink data scheduled by the DCI,
    wherein a separate transmission layer for the downlink data is transmitted from each of the plurality of base stations,
    wherein a total number of layers scheduled for the UE and demodulation reference signal (DMRS) grouping information associated with a separate transmission layer transmitted from each of the plurality of base stations are indicated by a single field in the DCI,
    wherein the single field represents one of a plurality of states, and each of the plurality of states represents one of combinations related to number of DMRS ports for each of the plurality of base stations,
    wherein the plurality of states includes at least one state related to non-coordinated transmission, and
    wherein the at least one state represents (i) a number of DMRS ports for a specific base station among the plurality of base stations as a number equal to the total number of layers and (ii) a number of DMRS ports for remaining base stations among the plurality of base stations as zero.

2. The method of claim 1, wherein the total number of layers scheduled for the UE is determined to be a sum of DMRS ports in all DMRS groups according to the DMRS grouping information.

3. The method of claim 1, wherein the DCI further includes one or more pieces of information among quasi-colocated (QCLed) per separate transmission layer channel state information reference signal (CSI-RS) resource information, rate matching information, or modulation and coding scheme (MCS) information.

4. The method of claim 3, wherein the DMRS group associated with the separate transmission layer transmitted from each base station is determined based on the QCLed CSI-RS resource information.

5. The method of claim 1, wherein information for mapping between the DMRS grouping information and a value of the single field in the DCI is configured per maximum number of base stations capable of performing the coordinated transmission.

6. The method of claim 5, wherein the DMRS grouping information includes single transmission by one specific base station as well as coordinated transmission by a plurality of base stations.

7. The method of claim 5, wherein the maximum number of base stations capable of performing the coordinated transmission is configured by radio resource control (RRC) and/or medium access control (MAC) signaling.

8. The method of claim 7, further comprising:
the DMRS grouping information is determined to differ by a value indicated by the single field in the DCI according to the maximum number of base stations capable of performing the coordinated transmission.

9. A user equipment (UE) configured to receive downlink control information (DCI) in a wireless communication system, the UE comprising:
a transceiver; and
a processor configured to control the transceiver,
wherein the processor is further configured to:
receive the DCI from any one of a plurality of base stations performing coordinated transmission to the UE; and
receive, from the plurality of base stations performing the coordinated transmission, downlink data scheduled by the DCI,
wherein a separate transmission layer for the downlink data is transmitted from each of the plurality of base stations,
wherein a total number of layers scheduled for the UE and demodulation reference signal (DMRS) grouping information associated with a separate transmission layer transmitted from each of the plurality of base stations are indicated by a single field in the DCI,
wherein the single field represents one of a plurality of states, and each of the plurality of states represents one of combinations related to number of DMRS ports for each of the plurality of base stations,
wherein the plurality of states includes at least one state related to non-coordinated transmission, and
wherein the at least one state represents (i) a number of DMRS ports for a specific base station among the plurality of base stations as a number equal to the total number of layers and (ii) a number of DMRS ports for remaining base stations among the plurality of base stations as zero.

10. A computer readable memory storing instructions that, based on being executed by a processor, control a user equipment (UE) to perform operations to receive downlink control information (DCI) in a wireless communication system, the operations comprising:
receiving the DCI from any one of a plurality of base stations performing coordinated transmission to the UE; and
receiving, from the plurality of base stations performing the coordinated transmission, downlink data scheduled by the DCI,
wherein a separate transmission layer for the downlink data is transmitted from each of the plurality of base stations,
wherein a total number of layers scheduled for the UE and demodulation reference signal (DMRS) grouping information associated with a separate transmission layer transmitted from each of the plurality of base stations are indicated by a single field in the DCI,
wherein the single field represents one of a plurality of states, and each of the plurality of states represents one of combinations related to number of DMRS ports for each of the plurality of base stations,
wherein the plurality of states includes at least one state related to non-coordinated transmission, and
wherein the at least one state represents (i) a number of DMRS ports for a specific base station among the plurality of base stations as a number equal to the total number of layers and (ii) a number of DMRS ports for remaining base stations among the plurality of base stations as zero.

* * * * *